US008925594B2

(12) United States Patent
Ohm et al.

(10) Patent No.: US 8,925,594 B2
(45) Date of Patent: Jan. 6, 2015

(54) PORTABLE TIRE INFLATOR AND REFLECTIVE DEVICE

(75) Inventors: Patrick L. Ohm, Mesa, AZ (US); C. Kwai Kong, Gilroy, CA (US); Alan Okamura, Santa Cruz, CA (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 533 days.

(21) Appl. No.: 13/342,833

(22) Filed: Jan. 3, 2012

(65) Prior Publication Data

US 2012/0168030 A1 Jul. 5, 2012

Related U.S. Application Data

(60) Provisional application No. 61/429,700, filed on Jan. 4, 2011.

(51) Int. Cl.
| | | |
|---|---|---|
| *B65B 57/00* | (2006.01) | |
| *F04B 35/06* | (2006.01) | |
| *F04B 35/04* | (2006.01) | |

(52) U.S. Cl.
CPC .................. *F04B 35/06* (2013.01); *F04B 35/04* (2013.01)
USPC .................. 141/38; 141/94; 141/95; 417/234

(58) Field of Classification Search
CPC ................................. B65B 57/00; B65B 57/18
USPC .................. 141/38, 94, 95; 417/234
See application file for complete search history.

(56) References Cited

U.S. PATENT DOCUMENTS

| | | | | | |
|---|---|---|---|---|---|
| 3,880,209 | A | * | 4/1975 | Haughn et al. | 141/95 |
| 4,187,058 | A | * | 2/1980 | Fish | 417/234 |
| 4,410,021 | A | * | 10/1983 | Blevins et al. | 141/95 |
| 4,632,242 | A | * | 12/1986 | Choi et al. | 206/45.24 |
| 4,756,697 | A | * | 7/1988 | Hefling | 439/568 |
| 4,776,766 | A | * | 10/1988 | Brent | 417/44.6 |
| 4,798,233 | A | * | 1/1989 | Mooney | 141/38 |
| 4,830,579 | A | * | 5/1989 | Cheng | 417/234 |
| 4,902,955 | A | * | 2/1990 | Manis et al. | 320/105 |
| 5,051,068 | A | * | 9/1991 | Wong | 417/234 |
| 5,282,438 | A | * | 2/1994 | McLaughlin | 119/248 |
| 5,568,117 | A | * | 10/1996 | Hsu | 340/321 |
| 6,155,313 | A | * | 12/2000 | Smalley | 141/38 |
| 6,705,360 | B1 | * | 3/2004 | Bonzer | 141/38 |

(Continued)

FOREIGN PATENT DOCUMENTS

EP 1605162 A2 12/2005

*Primary Examiner* — Timothy L Maust
*Assistant Examiner* — Andrew Schmid
(74) *Attorney, Agent, or Firm* — Booth Udall Fuller, PLC

(57) ABSTRACT

The present disclosure describes a structure for a portable tire inflator that includes a triangular housing comprising a triangular face, a triangular back, two sides extending between the triangular face and the triangular back on first and second sides of the triangular face and back, and a support base on a third side of the triangular face and back extending between the triangular face and the triangular back, a pump motor within the housing. The inflator may be configured such that a majority of the total weight of the portable tire inflator is positioned between the middle of the triangular face and the base. The tire inflator may also include a reflective border on at least two of three edges of the triangular face and an air pressure indicator responsive to air pressure within the air hose, the air pressure indicator visible on an external surface of the housing.

19 Claims, 4 Drawing Sheets

(56) References Cited

U.S. PATENT DOCUMENTS

| | | | |
|---|---|---|---|
| 7,789,112 B1 * | 9/2010 | Wise | 141/95 |
| D668,676 S * | 10/2012 | Ohm et al. | D15/7 |
| D669,502 S * | 10/2012 | Ohm et al. | D15/9 |
| D670,313 S * | 11/2012 | Ohm et al. | D15/7 |
| D671,560 S * | 11/2012 | Ohm et al. | D15/7 |
| D679,291 S * | 4/2013 | Ohm et al. | D15/7 |
| D694,267 S * | 11/2013 | Ohm et al. | D15/7 |
| D695,319 S * | 12/2013 | Ohm et al. | D15/9 |
| 2010/0108186 A1 * | 5/2010 | Yoshida et al. | 141/38 |
| 2010/0186849 A1 * | 7/2010 | Yoshida et al. | 141/38 |
| 2010/0224281 A1 * | 9/2010 | Yoshida et al. | 141/38 |
| 2011/0155279 A1 * | 6/2011 | Marini | 141/5 |
| 2011/0180180 A1 * | 7/2011 | Lolli et al. | 141/38 |
| 2012/0168030 A1 * | 7/2012 | Ohm et al. | 141/94 |
| 2012/0168031 A1 * | 7/2012 | Ohm et al. | 141/95 |
| 2012/0285581 A1 * | 11/2012 | McCaughey | 141/38 |
| 2013/0145834 A1 * | 6/2013 | Mouchet | 73/146.4 |

* cited by examiner

US 8,925,594 B2

PORTABLE TIRE INFLATOR AND REFLECTIVE DEVICE

CROSS REFERENCE TO RELATED APPLICATIONS

This document claims the benefit of the filing date of U.S. Provisional Patent Application 61/429,700, entitled "PORTABLE TIRE INFLATOR" to Ohm which was filed on Jan. 4, 2011, the contents of which are hereby incorporated by reference.

BACKGROUND

1. Technical Field

Aspects of this document relate generally to portable tire inflators.

2. Background Art

Flat tires are a problem to which no car owner is immune. Typically, car owners or drivers will, upon discovering a flat or a low tire, drive to the nearest service station to inflate or fix the tire, or replace the problematic tire with a spare tire. Such remedies are typically inconvenient and time consuming for the car owner or driver. Safety factors when car owners change a tire are also of great concern as the tire generally needs to be changed on a street where other moving cars are common.

SUMMARY

Aspects of a portable tire inflator may comprise a triangular housing comprising a triangular face, a triangular back, two sides extending between the triangular face and the triangular back on first and second sides of the triangular face and back, and a support base on a third side of the triangular face and back extending between the triangular face and the triangular back, a pump motor within the housing, a reflective border on at least two of three edges of the triangular face, an air hose extending from the housing and in fluid communication with the pump motor such that when the pump motor is activated pressurized air from the pump motor is passed to the air hose, an air pressure indicator responsive to air pressure within the air hose, the air pressure indicator visible on an external surface of the housing; and a power switch disposed on the housing and electrically coupled to the pump motor, wherein a majority of a total weight of the portable tire inflator is positioned between a midpoint of the triangular face and the base.

Particular embodiments and implementations may comprise one or more of the following features. The portable tire inflator may comprise at least one light emitting diode (LED) side light on a rotatable arm on at least one side of the two sides and a light switch electrically coupled to the at least one LED side light. The portable tire inflator may comprise at least one LED border light between the reflective border and the triangular face, the at least one LED border light visible through the reflective border when the at least one LED is activated. The portable tire inflator may comprise at least one LED face light on the triangular face of the housing, wherein the at least one LED face light flashes when activated. The portable tire inflator may comprise a retractable hanger within a slot at a peak of the triangular housing, the retractable hanger configured to retract into the slot to a first, storage position, and extend from the slot to a second, hanger position, the retractable hanger comprising an aperture therethrough. The portable tire inflator may comprise an air pressure regulator operably associated with the motor to restrict the tire inflator from inflating a tire through the air hose beyond a preset tire air pressure value. The air pressure display may comprise a radial air pressure gauge and a needle that together are responsive to tire air pressure during tire inflator use. The portable tire inflator may comprise a regulator dial comprising a regulator marker, wherein the regulator dial is configured to rotate about the radial air pressure gauge such that the marker establishes the preset tire air pressure value. The air pressure display may comprise a digital air pressure gauge that is responsive to tire air pressure during tire inflator use. The portable tire inflator may comprise programming buttons on the digital air pressure gauge, the programming buttons configured to allow a user to program the preset tire pressure value. The portable tire inflator may comprise an inflation connector and a deflation connector on the face of the body. The power switch may comprise a first position for a high pump motor setting, a second position for a low pump motor setting, and a third position for an off pump motor setting. The reflective border on at least two of three edges of the triangular face may comprise a reflective border on three edges of the triangular face.

Aspects of a portable tire inflator may comprise a triangular housing comprising a pump motor therein, an air hose extending from the housing and in fluid communication with the pump motor such that when the pump motor is activated pressurized air from the pump motor is passed to the air hose, a valve stem connector on an end of the air house distal to the housing, a reflective triangular border on at least one side of the triangular housing, and wherein a majority of a total weight of the portable tire inflator is positioned between a midpoint of the at least one side of the triangular housing and a base of the portable tire inflator.

Particular embodiments and implementations may comprise one or more of the following features. The portable tire inflator may comprise at least one reflector light disposed between the reflective triangular border and the triangular housing. The portable tire inflator may comprise at least one side housing light disposed on the housing. The portable tire inflator may comprise an air pressure indicator responsive to air pressure within the air hose, the air pressure indicator visible on an external surface of the housing. The portable tire inflator may comprise a power switch disposed on the housing and electrically coupled to the light source and to the pump motor. The portable tire inflator may comprise a retractable hanger within a slot at a peak of the triangular housing, the retractable hanger configured to retract into the slot to a first, storage position, and extend from the slot to a second, hanger position, the retractable hanger comprising an aperture therethrough. The portable tire inflator may comprise an air pressure regulator operably associated with the motor to restrict the tire inflator from inflating a tire through the air hose beyond a preset tire air pressure value.

A tire inflator 100 may further comprise an air hose 105 extending from the housing 150. In some implementations, the air hose 105 may extend from the third side 156 or the support base 157 of the housing 150, while in other implementations, the air hose 105 may extend from any portion of the housing 150. In an implementation, an air hose channel 161 between the third side 156 of the housing 150 and the support base 157 is sized to hold the air hose 105 within the channel. In such an implementation, the air hose 105 may extend from an opening on the air hose channel 161.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶6. Thus, the use of the words "function," "means" or "step" in the Description, Drawings, or Claims is not intended to somehow indicate a desire to invoke the special provisions of 35 U.S.C. §112, ¶6, to define the invention. To the contrary, if the provisions of 35 U.S.C. §112, ¶6 are sought to be invoked to define the claimed disclosure, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . ." or "step for performing the function of . . . ," if the claims also recite any structure, material or acts in support of that means or step, or that perform the recited function, then it is the clear intention of the inventors not to invoke the provisions of 35 U.S.C. §112, ¶6. Moreover, even if the provisions of 35 U.S.C. §112, ¶6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended tire inflator and/or assembly procedures for tire inflators will become apparent for use with implementations of tire inflators from this disclosure. Accordingly, for example, although particular tire inflators are disclosed, such tire inflators and implementing components may comprise any shape, size, style, type, model, version, measurement, concentration, material, quantity, and/or the like as is known in the art for such tire inflators and implementing components, consistent with the intended operation of tire inflators.

Figure 1:
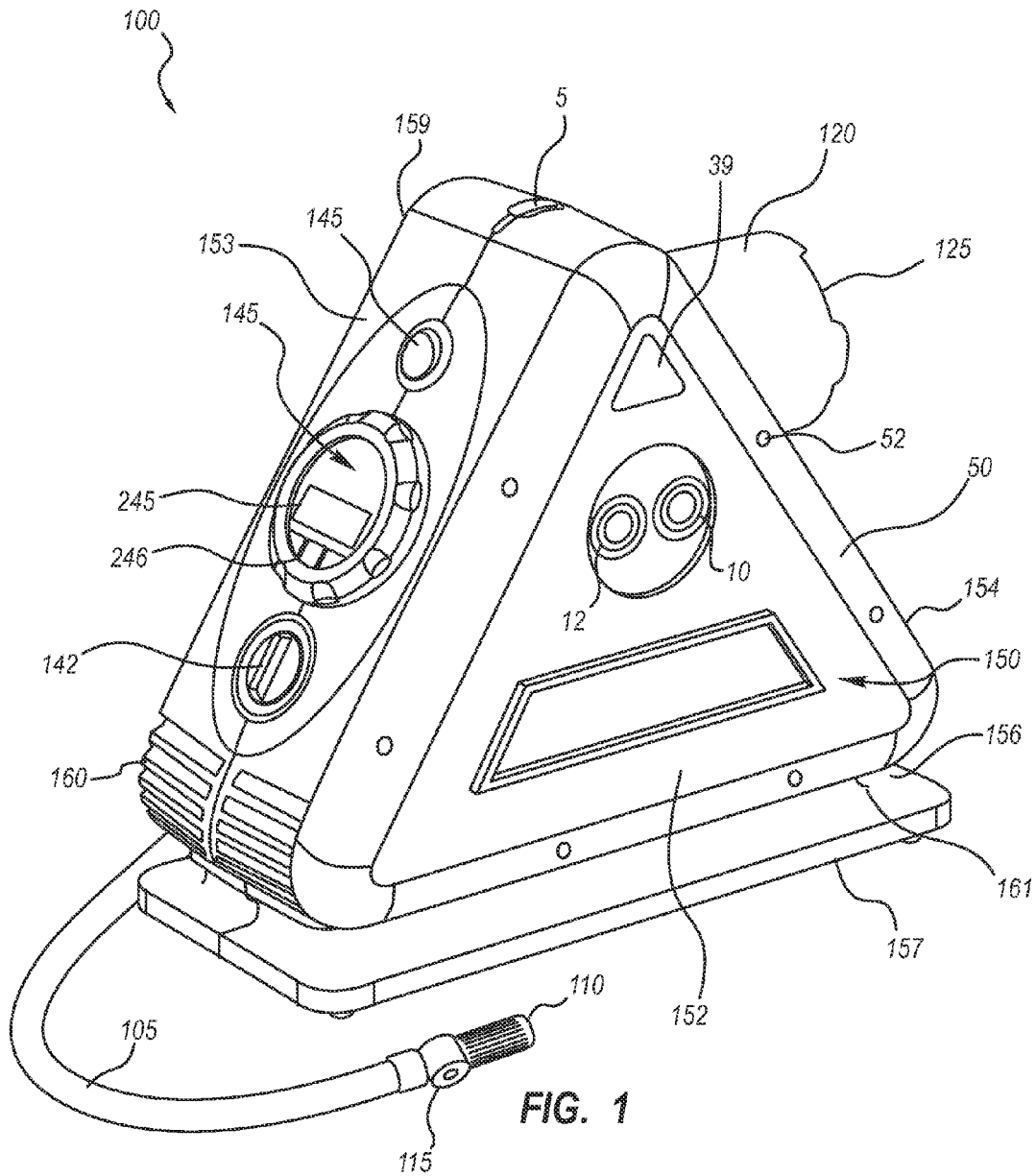
FIG. 1 is a front perspective view of a first implementation of a tire inflator.

As illustrated in FIG. 1, an implementation of a tire inflator 100 may comprise a housing 150 with a pump motor housed therein. Any pump motor known to those having skill in the art is contemplated for use in the housing of this disclosure such as, but not limited to, single speed motors, variable speed motors, and the like. The housing 150 may further house a rechargeable battery in various implementations.

In an implementation, the housing 150 comprises a triangular face 152, a triangular back 159, and two sides 153, 154 extending between the triangular face 152 and the triangular back 159. The housing 150 may further comprise a support base 157 on or equivalently coupled to a third side 156 of the housing 150, the third side 156 also extending between the triangular face 152 and the triangular back 159. The pump motor and/or rechargeable battery within the housing 150 may be arranged such that a majority of the total weight of the tire inflator is position between a midpoint 500 (FIG. 2) of the triangular face and the base. This displacement of weight significantly increases the overall stability of the tire inflator. Particularly in implementations where the tire inflator is also used as a safety reflector, as in particular implementations of the present disclosure, this can provide an additional benefit.

Implementations of a tire inflator 100 may further comprise various configurations of reflective material(s) placed anywhere on the housing 150. In an implementation, the tire inflator 100 comprises a reflective border 50 on at least two of the three edges of the triangular face 152. In other implementations, a tire inflator 100 may comprise a second reflective border on at least two of the three edges of the triangular back 159. In some implementations, the reflective border 50 on at least two of the three edges comprises a continuous triangle of reflective material around all three edges of the face 152 and/or back 159 of the triangular shape. In still other implementations, a reflective material may substantially cover any of the triangular face, 152, either of the two sides 153, 154, or the triangular back 159. The reflective border 50 or material may comprise any material or combinations of materials that reflect light in any of many varying degrees.

In an implementation of a tire inflator 100 comprising a reflective border 50, the tire inflator may further comprise at least one border light 52 on or under the reflective border 50. In implementations where the at least one border light 52 is positioned under the reflective border 50, the at least one border light 52 may comprise any type of light visible through the reflective border 50, such as but not limited to a light emitting diode (LED) light, an incandescent light, an iridescent light, and the like. In particular implementations, the at least one border light 52 comprises at least one border light 52 on each of the three sides, and in some particular implementations, the at least one border light 52 on each of the three sides comprises multiple border lights 52 on each of the three edges of the triangular shape under the reflective border 50. The border light 52 may be placed over the exterior of the reflective border 50, or may be placed between the triangular face 152 of the housing 150 and the reflective border 50. In an implementation, the reflective border 50 comprises a reflective tape or material applied to the triangular face 152 and a translucent covering coupled to the triangular face 152 over the reflective tape. In such an implementation, the at least one border light 52 may comprise a light between the reflective tape and the translucent covering of the reflective tape. The at least one border light 52 may be electrically coupled to a border light switch 39, a main power switch 140, or any other switch associated with other lights or features on the tire inflator 100. The border light switch 39 may further be electrically coupled to the pump motor, rechargeable battery, or any other power source.

An implementation of the tire inflator 100 may further comprise a side light source 125. The side light source 125 may comprise any type of light or lighting arrangement, including but not limited to at least one LED light, at least one incandescent light, at least one iridescent light, and the like. In an implementation, the side light source 125 is housed in a rotatable housing 120. The side light may be housed on either of the first 153 or second 154 sides of the housing 150 generally centered on the respective side(s) 153, 154 on which it is placed. The side light source 125 may be electrically coupled to a side light switch 142, a main power switch 140, or any other switch associated with other lights or features on the tire inflator 100. The border light switch may further be electrically coupled to the pump motor, rechargeable battery, or any other power source. The side light source 125 may be adapted to be orientable such that a user can orient the direction in which the side light source 125 shines to a degree without moving the housing 150. In a particular implementation, the side light source 125 is tiltably coupled to the housing 150 through a universal joint that allows the light source 125 to tilt up to 90 degrees (for example tilting from facing horizontal to facing vertical) in an up and down direction, and up to 45 degrees left and right.

The housing may further comprise a plurality of air vents disposed anywhere on the housing. In the implementation illustrated in FIG. 1, the tire inflator 100 comprises air vents 160 located near the third side 156 of the housing 150. In a particular implementation, the housing may comprise two series of air vents: an intake series of air vents and an exhaust series of air vents. Such a configuration assists to prevent overheating of the pump motor and excessive temperatures of the housing 150. These and other implementations may utilize a forced air cooling technology, wherein an air-cooled motor assembly helps to prevent overheating.

A tire inflator 100 may further comprise an air hose 105 extending from the housing 150. In some implementations, the air hose 105 may extend from the third side 156 or the support base 157 of the housing 150, while in other implementations, the air hose 150 may extend from any portion of the housing 150. In an implementation, an air hose channel 161 between the third side 156 of the housing 150 and the support base 157 is sized to hold the air hose 105 within the channel. In such an implementation, the air hose 105 may extend from an opening on the air hose channel 161.

The air hose 105 is in fluid communication with the pump motor such that when the pump motor is activated, pressurized air from the pump motor is passed to the air hose 105. The air hose 105 then transfers pressurized air into a tire to inflate the tire. The air hose 105 may comprise any flexible, coiled, or otherwise bendable hose suitable for transferring air. In some implementations, transfer of air from the air hose 105 to the tire is facilitated by a valve stem connector 110 on an end of the air hose 105 distal to the housing 150. The valve stem connector 110 may connect to a valve stem of a tire, inner tube, or any other inflatable object. The air hose 105 may further comprise a bleeder valve element 115 that allows a user to manually release small or controlled amounts of air from the tire or from the air pump by pressing on the bleeder valve element 115.

An implementation of the tire inflator 100 may further comprise an inflation adapter or connector 12 and a deflation adapter or connector 10 on the triangular face 152 of the tire inflator. The inflation 12 and deflation adapter 10 may be adapted to removably couple to additional hoses or elements to inflate low pressure items such as but not limited to rafts, mattresses, tubes, and the like. The inflation 12 and deflation adapter 10 is generally used for low pressure items such as inflatable mattresses, balls and tubes rather than tires. In particular implementations, the pump motor used may be a variable speed motor to allow a user to select whether high pressure (such as for an automobile tire) will be produced by the pump, or low pressure (such as for an inflatable mattress) will be produced by the pump. In situations where a low pressure is to be produced, the user can use the inflation 12 and deflation adapters 10.

Various implementations of a tire inflator 100 may further comprise a power switch 140 disposed anywhere on the housing 150. The power switch may be electrically coupled to either a side light source 125, the pump motor, the at least one border light 52, the face light 54, or any combination of these. For example, in an implementation, the power switch 140 is configured to turn on or activate the light source 125 in a first position, turn on or activate both the light source 125 and the pump motor in a second position, and turn off or deactivate both the light source 125 and the pump motor in a third position. In other implementations, a tire inflator 100 may comprise a plurality of power switches disposed at various locations on the housing 150. Each of the plurality of power switches may be assigned or electrically coupled to different functions or elements, such as but not limited to a power switch for the light source 125, the face light 54, the at least one border light 52, a power switch for the pump motor, a power switch for a tire pressure gauge, or a power switch to activate rechargeable battery or any other power source.

A tire inflator 100 may further comprise a pressure indicator 145 positioned anywhere on the housing 150 of the tire inflator 100. In the implementation illustrated in FIG. 1, the pressure indicator 145 is positioned on the first side 153 of the housing 150. In other implementations, the pressure indicator may be positioned on the second side 154, the triangular face 152, or the triangular back 159. Placement of the various components in the particular implementation illustrated in FIG. 1 allow for a small, portable unit. The pressure indicator 145 is responsive to air pressure within the air hose 105, the pump motor, the valve stem connector 110, or the tire the air hose 105 to which the air hose is connected. In an implementation, the pressure indicator 145 displays the approximate air pressure of air within the tire during pumping by indicating the air pressure within the air hose 105 or the air pressure exerted on the pump motor. It should be understood that reference herein to air pressure within the air hose may equivalently be any display of air pressure value or preset air pressure values that are an approximation of actual values or the display of values substantially similar to actual air pressure values within the air hose as air pressure measurements anywhere within the system will give an approximation of the air pressure within the tire being inflated.

In an implementation, the pressure indicator 145 may comprise a radial air pressure gauge and a needle that together are responsive to tire air pressure and/or air hose 105 air pressure during use of the tire inflator 100. For example, the radial air pressure gauge may comprise range of air pressure values spread annularly across the radial air pressure gauge, often in a plurality of measurement units, such as pounds per square inch (PSI), bars, atmospheres, and the like. When the pump motor is in use, the needle may move to a position along the annularly arranged pressure values to indicate air pressure within the air hose 105.

In another implementation, the pressure indicator 145 may comprise a digital air pressure gauge 245 (shown in FIG. 4) responsive to tire air pressure and/or air hose 105 air pressure during use of the tire inflator 100. The digital air pressure gauge 245 may display either a numeric air pressure, or a digital image similar to the radial air pressure gauge and needle previously described.

Figure 2:
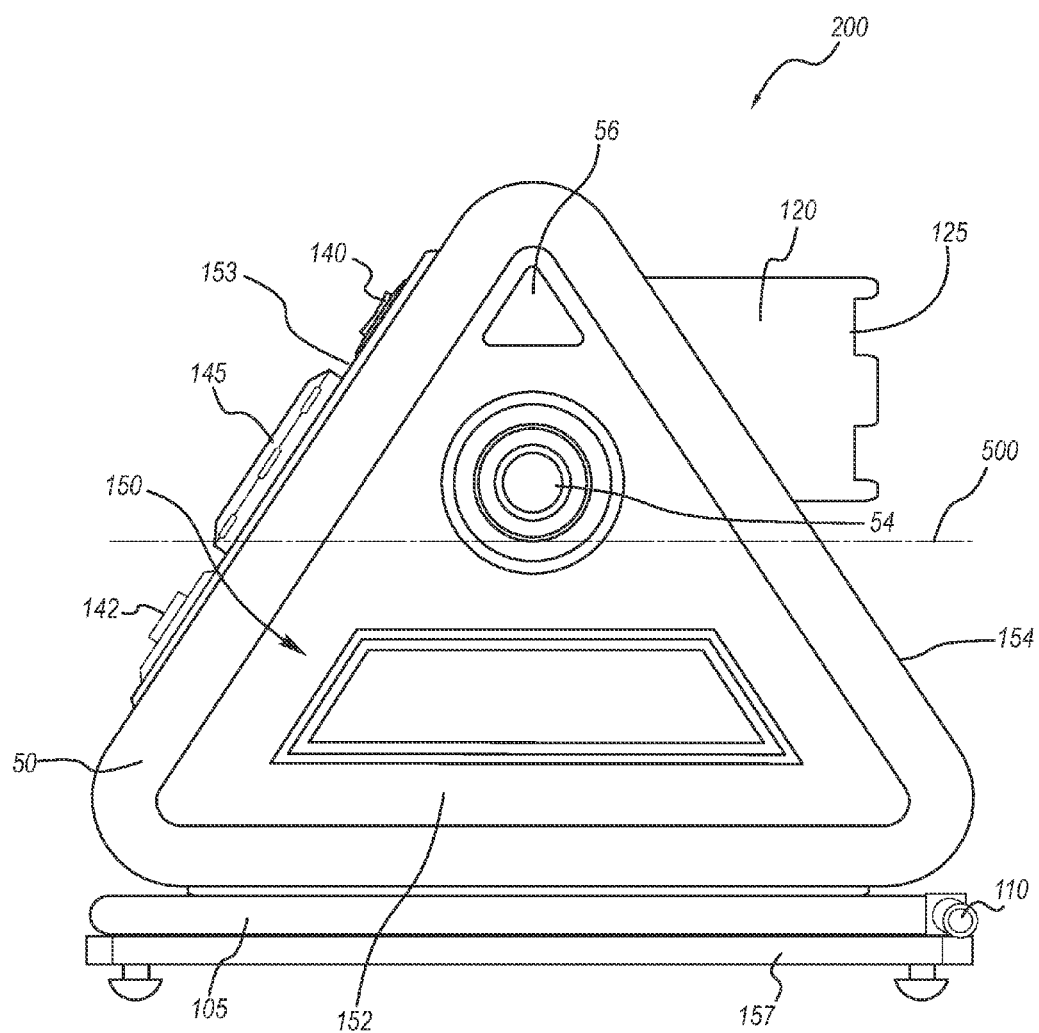
FIG. 2 is a front view of second implementation of a tire inflator.

As illustrated in FIG. 2, an implementation of the tire inflator 200 may further comprise a face light 54 on the triangular face 152 of the housing 150, in addition to or instead of the side light source 125. The face light 54 may comprise any type of light or lighting arrangement, including but not limited to at least one LED light, at least one incandescent light, at least one iridescent light, and the like. The face light 54 may be electrically coupled to a face light switch 56, a main power switch, or any other switch associated with other lights or features on the tire inflator 200. The face light switch 56 may further be electrically coupled to the pump motor, rechargeable battery, or any other power source.

Figure 3:
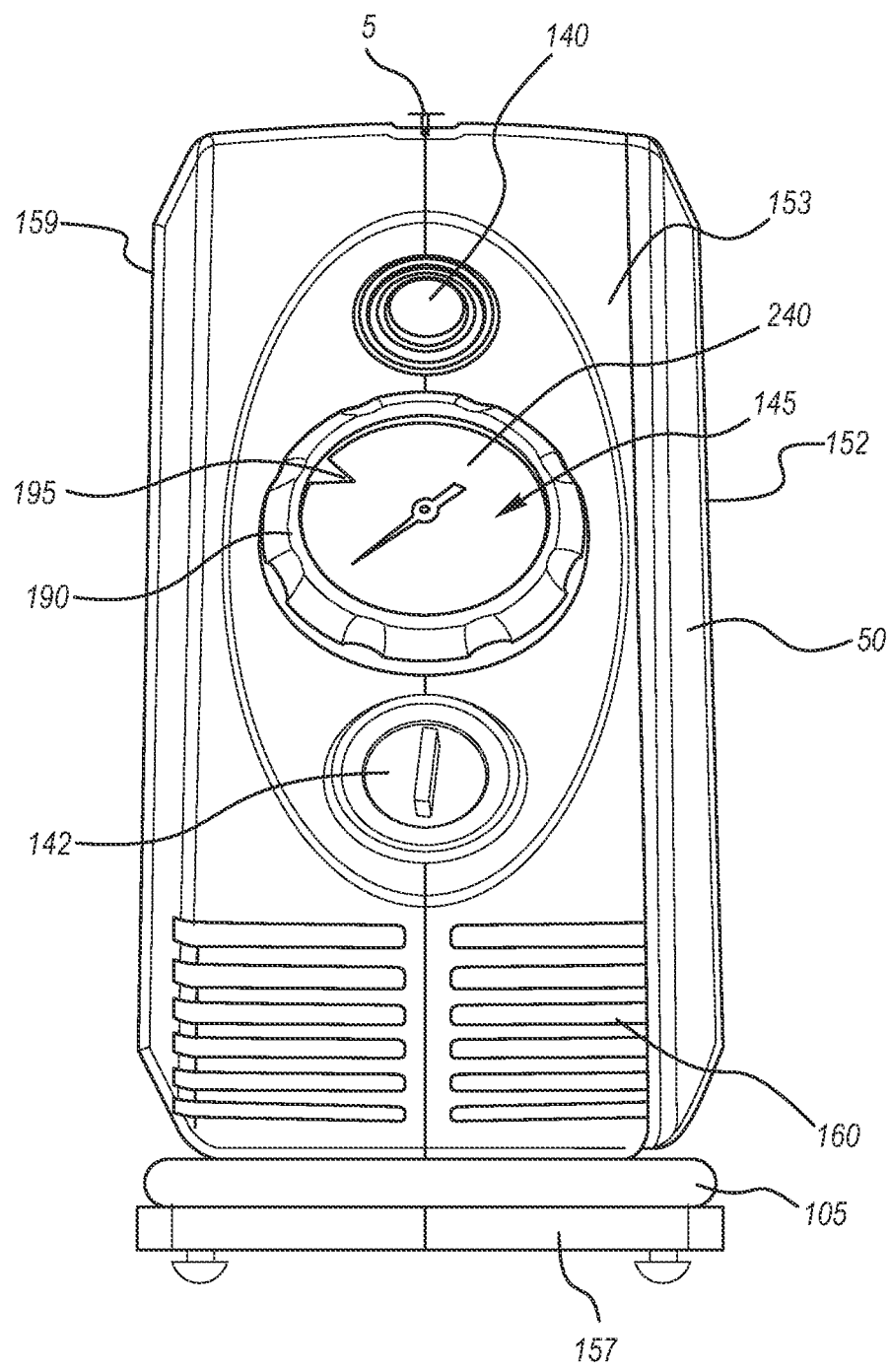
FIG. 3 is a side view of a second implementation of a tire inflator.

Referring now to FIG. 3, wherein a side view of an implementation of a tire inflator 100 is shown. In addition to aspects previously referenced and described, FIG. 2 also illustrates a regulator dial 190 and a regulator marker 195 present in various implementations of a tire inflator 100. Implementations of the tire inflator 200 may further comprise an air pressure regulator or limiter associated with the pump motor to prevent the tire inflator from inflating a tire through the air hose 105 beyond a preset tire air pressure value. The air pressure regulator may act to completely deactivate the pump motor, reduce power of the pump motor to a lower pump motor setting, or open an exhaustion element that reduces air pressure within the air hose 105.

A tire inflator 100 may further comprise various elements that allow a user to establish the preset tire air pressure value. In implementations comprising a radial air pressure gauge, a tire inflator 200 may comprise the regulator dial 190 comprising a regulator marker 195. The regulator dial 190 may be configured to rotate about the radial air pressure gauge 240 such that the regulator marker 195 establishes the preset tire air pressure value by pointing to an air pressure value on the radial air pressure gauge 240. In implementations comprising a digital air pressure gauge 245 (shown in FIG. 4.), a tire inflator 100 may comprise programming buttons 246 or other elements that allow a user to establish the preset tire air pressure value.

Figure 4:
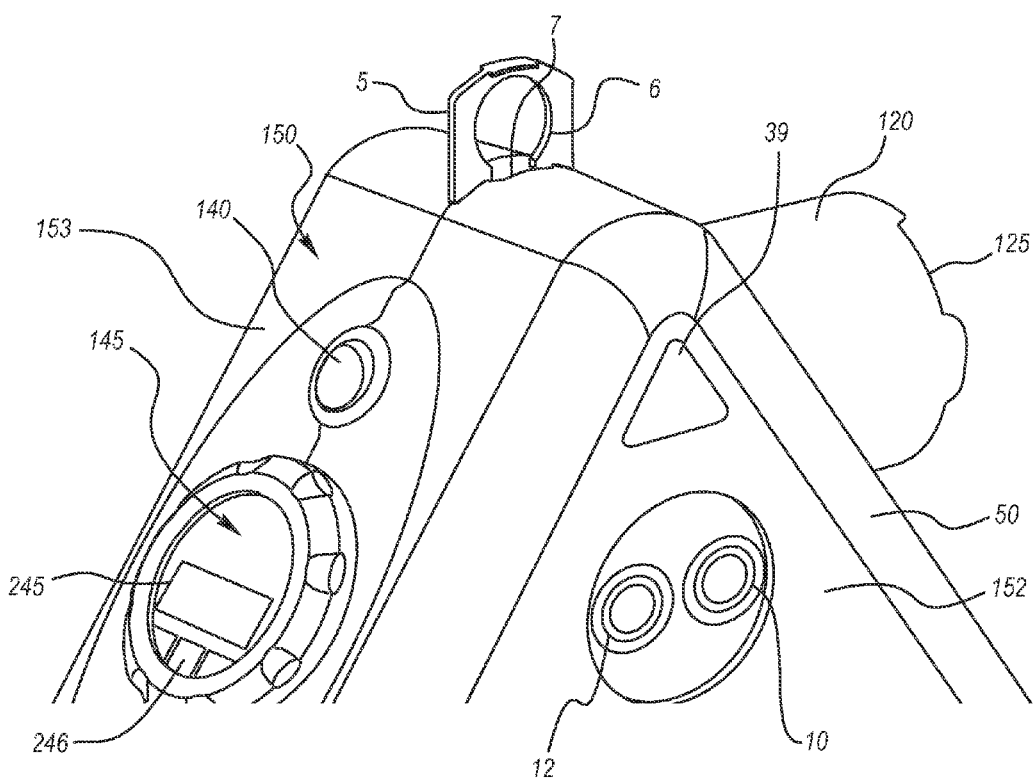
FIG. 4 is a close-up view of a tire inflator with a hanging element extended.

Referring now to FIG. 4, an implementation of the tire inflator 100 may further comprise a rectractable hanger 5 within a slot 7 at a peak of the triangular housing 150. FIG. 4 illustrates the retractable hanger 5 in an extended or hanger position from the housing 150, while FIG. 1 illustrates the retractable hanger 5 in a retracted or storage position within the slot 7 on the housing 150. The retractable hanger 5 may further comprise an aperture 6 therethrough, allowing a user to hang the tire inflator 100 from a variety of elements such as on a wall for storage, or from a portion of the car during use, or simply to provide an easy finger-hold loop for carrying or during use.

It will be understood that implementations are not limited to the specific components disclosed herein, as virtually any components consistent with the intended operation of a method and/or system implementation for tire inflators may be utilized. Accordingly, for example, although particular tire inflators may be disclosed, such components may comprise any shape, size, style, type, model, version, class, grade, measurement, concentration, material, weight, quantity, and/or the like consistent with the intended operation of a method and/or system implementation for a tire inflators may be used.

In places where the description above refers to particular implementations of tire inflators, it should be readily apparent that a number of modifications may be made without departing from the spirit thereof and that these implementations may be applied to other tire inflators. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A portable tire inflator, comprising:
    a triangular housing comprising a triangular face, a triangular back, two sides extending between the triangular face and the triangular back on first and second sides of the triangular face and back, and a support base on a third side of the triangular face and back extending between the triangular face and the triangular back;
    a pump motor within the housing;
    a reflective border on at least two of three edges of the triangular face;
    an air hose extending from the housing and in fluid communication with the pump motor such that when the pump motor is activated pressurized air from the pump motor is passed to the air hose;
    an air pressure indicator responsive to air pressure within the air hose, the air pressure indicator visible on an external surface of the housing; and
    a power switch disposed on the housing and electrically coupled to the pump motor;
    at least one light emitting diode (LED) border light between the reflective border and the triangular face, the at least one LED border light being visible through the reflective border when the at least one LED is activated;
    wherein a majority of a total weight of the portable tire inflator is positioned between a midpoint of the triangular face and the base.

2. The portable tire inflator of claim 1, further comprising at least one LED side light on a rotatable arm on at least one side of the two sides and a light switch electrically coupled to the at least one LED side light.

3. The portable tire inflator of claim 1, further comprising at least one LED face light on the triangular face of the housing, wherein the at least one LED face light flashes when activated.

4. The portable tire inflator of claim 1, further comprising a retractable hanger within a slot at a peak of the triangular housing, the retractable hanger configured to retract into the slot to a first, storage position, and extend from the slot to a second, hanger position, the retractable hanger comprising an aperture therethrough.

5. The portable tire inflator of claim 4, further comprising an air pressure regulator operably associated with the motor to restrict the tire inflator from inflating a tire through the air hose beyond a preset tire air pressure value.

6. The portable tire inflator of claim 5, wherein the air pressure indicator comprises an air pressure display comprising a radial air pressure gauge and a needle that together are responsive to tire air pressure during tire inflator use.

7. The portable tire inflator of claim 6, further comprising a regulator dial comprising a regulator marker, wherein the regulator dial is configured to rotate about the radial air pressure gauge such that the marker establishes the preset tire air pressure value.

8. The portable tire inflator of claim 5, wherein the air pressure indicator comprises an air pressure display comprising a digital air pressure gauge that is responsive to tire air pressure during tire inflator use.

9. The portable tire inflator of claim 8, further comprising programming buttons on the digital air pressure gauge, the programming buttons configured to allow a user to program the preset tire pressure value.

10. The portable tire inflator of claim 5, further comprising an inflation connector and a deflation connector on the face of the body.

11. The portable tire inflator of claim 5, wherein the power switch comprises a first position for a high pump motor setting, a second position for a low pump motor setting, and a third position for an off pump motor setting.

12. The portable tire inflator of claim 1, wherein a reflective border on at least two of three edges of the triangular face comprises a reflective border on three edges of the triangular face.

13. A portable tire inflator, comprising:
a triangular housing comprising a triangular face, a triangular back, two sides extending between the triangular face and the triangular back on first and second sides of the triangular face and back, and a support base on a third side of the triangular face and back extending between the triangular face and the triangular back;
a pump motor within the housing;
a reflective border on at least two of three edges of the triangular face;
an air hose extending from the housing and in fluid communication with the pump motor such that when the pump motor is activated pressurized air from the pump motor is passed to the air hose;
an air pressure indicator responsive to air pressure within the air hose, the air pressure indicator visible on an external surface of the housing and comprising an air pressure display comprising a radial air pressure gauge and a needle that together are responsive to tire air pressure during tire inflator use;
a regulator dial comprising a regulator marker, wherein the regulator dial is configured to rotate about the radial air pressure gauge such that the marker establishes the preset tire air pressure value;
a power switch disposed on the housing and electrically coupled to the pump motor;
a retractable hanger within a slot at a peak of the triangular housing, the retractable hanger configured to retract into the slot to a first, storage position, and extend from the slot to a second, hanger position, the retractable hanger comprising an aperture therethrough; and
an air pressure regulator operably associated with the motor to restrict the tire inflator from inflating a tire through the air hose beyond a preset tire air pressure value.

14. The portable tire inflator of claim 13, further comprising at least one light emitting diode (LED) side light on a rotatable arm on at least one side of the two sides and a light switch electrically coupled to the at least one LED side light.

15. The portable tire inflator of claims 13, further comprising at least one LED border light between the reflective border and the triangular face, the at least one LED border light being visible through the reflective border when the at least one LED is activated.

16. The portable tire inflator of claim 13, further comprising at least one LED face light on the triangular face of the housing, wherein the at least one LED face light flashes when activated.

17. The portable tire inflator of claim 13, further comprising an inflation connector and a deflation connector on the face of the body.

18. The portable tire inflator of claim 13, wherein the power switch comprises a first position for a high pump motor setting, a second position for a low pump motor setting, and a third position for an off pump motor setting.

19. The portable tire inflator of claim 13, wherein a reflective border on at least two of three edges of the triangular face comprises a reflective border on three edges of the triangular face.

* * * * *